Figure 1:
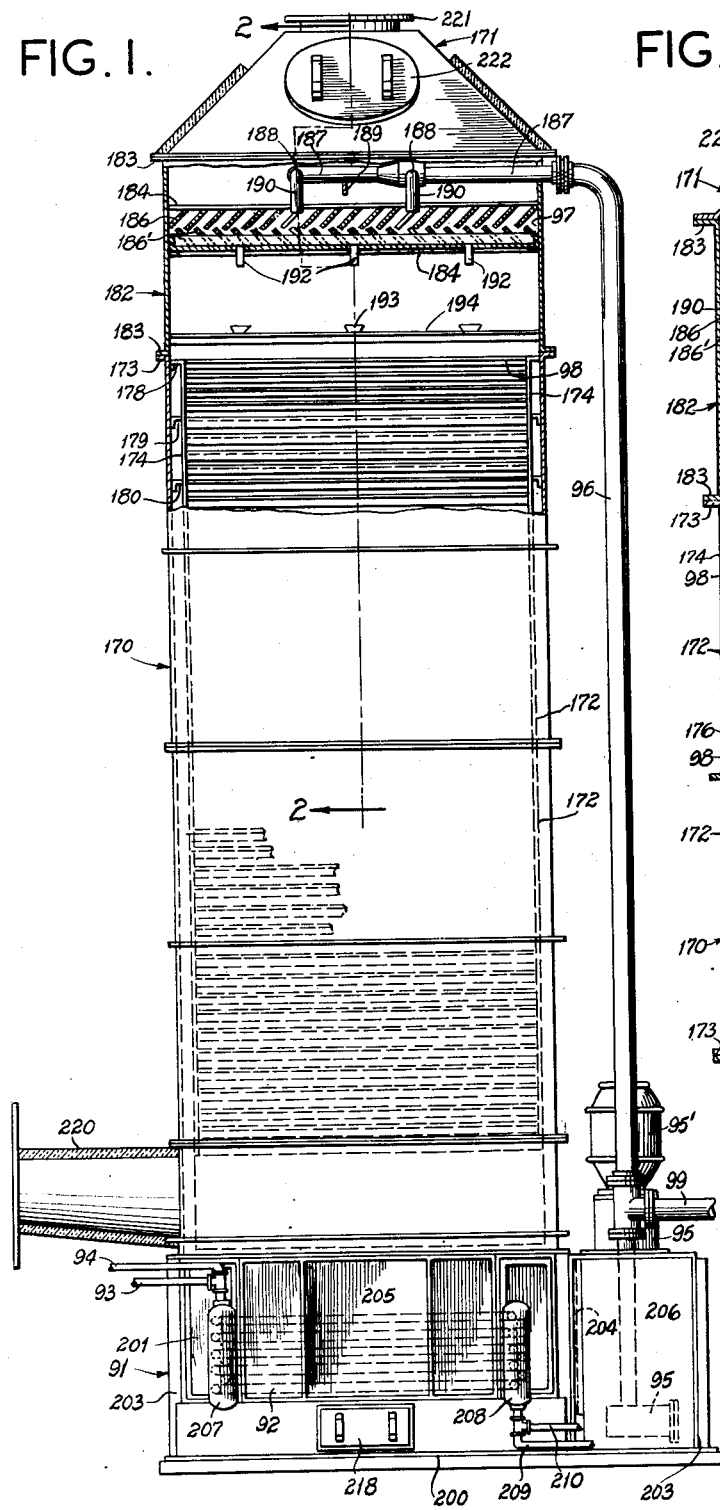

July 15, 1952     S. L. NEVINS ET AL     2,603,464

RECOVERY OF ELEMENTAL SULFUR

Original Filed Jan. 25, 1945

Samuel L. Nevins
James S. Gilliam, Jr.
Inventors
Haynes and Koenig
Attorneys

Patented July 15, 1952

2,603,464

UNITED STATES PATENT OFFICE 2,603,464

RECOVERY OF ELEMENTAL SULFUR

Samuel L. Nevins, Little Rock, and James S. Gilliam, Jr., Stamps, Ark., assignors, by mesne assignments, to The Fluor Corporation, Ltd., a corporation of California Original application January 25, 1945, Serial No. 574,607. Divided and this application March 28, 1949, Serial No. 83,906

2 Claims. (Cl. 261—11)

This invention relates to the recovery of elemental sulfur and more particularly to apparatus for condensing vapor phase sulfur.

This application is a division of our copending application Serial No. 574,607, filed January 25, 1945, now Patent No. 2,534,792 of December 19, 1950.

Briefly, the invention comprises vapor phase sulfur condensing apparatus which includes a plurality of vertically spaced, substantially horizontal baffles, horizontally offset from each other.

The waste acidic gases separated in the various extraction processes employed in the manufacture of commercial natural gas, coke oven gas, and petroleum products, normally contain sulfur in the form of hydrogen sulfide, and in addition thereto, usually contain water vapor and various gaseous materials in the form of carbon dioxide, carbon monoxide, and hydrogen, and in many instances sundry hydrocarbons such as methane, ethane, and propane. Again, in some waste acidic gases are found such sulfur compounds as, hydrogen sulfide, sulfur dioxide, carbonoxysulfide, carbon disulfide, and in certain instances, alkyl sulfides, together with gaseous paraffinic and olefinic hydrocarbons, water vapor, carbon dioxide, and hydrogen.

Certain chemical treating plants may produce waste gases containing recoverable amounts of sulfur compounds, usually mixed or combined with impurities. For example, plants for the manufacture of carbon disulfide from sulfur and methane, may throw off waste gases containing sulfur vapor, hydrogen sulfide, methane, and other hydrocarbons.

Attempts have been made previously to recover commercially profitable yields of elemental sulfur from such waste acidic gases but without success, since the reactions which are reputed to occur in the treatment of hydrogen sulfide gases are not realized, which may be explained in part by reaction disturbances caused by other gaseous impurities and materials which the waste acidic gases contain. It has therefore been the common practice to burn such waste acidic gases under boilers or in flare towers since such waste acidic gases have an obnoxious odor and are lethal in character and hence cannot be discharged into the atmosphere.

An object of this invention is to provide an improved apparatus for the treatment of waste acidic gases containing sulfur compounds whereby elemental sulfur of high quality may be recovered in a highly economical and practical manner.

Another object of this invention is to provide an improved apparatus for the treatment of waste acidic gases containing sulfur compounds whereby the obnoxious and toxic constituents may be substantially completely removed therefrom, thereby providing a resulting effluent gas unharmful to animal and plant life.

Another object of this invention is to provide a highly economical and efficient apparatus for the recovery of elemental sulfur from gases cast off from refining, gas treating, and chemical operations.

Other objects and advantages of this invention will be more readily understood and comprehended from the following disclosure.

Figure 2:
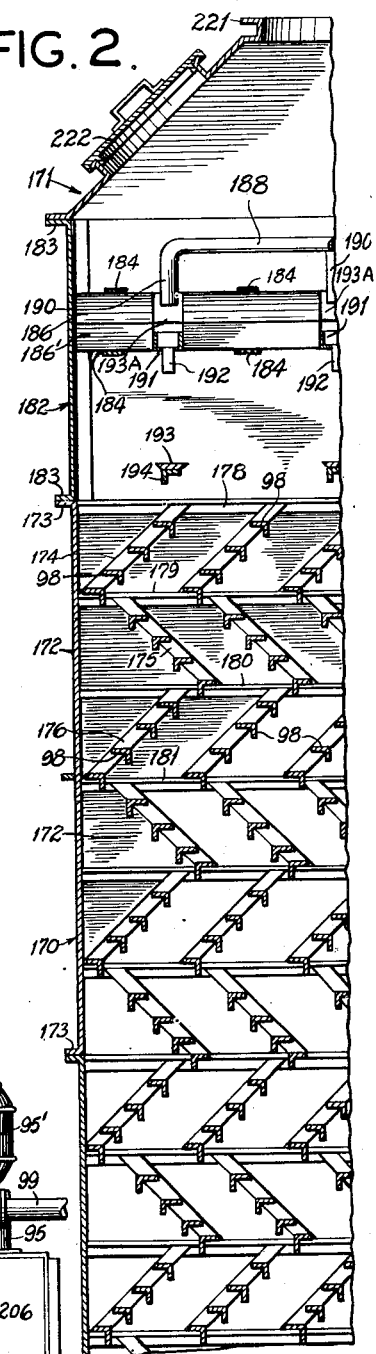

For ready comprehension of the invention, the chemical and physiochemical factors involved in the operation, and the design and construction of the apparatus, there is shown in the accompanying drawing a series of embodiments of physical structure in which:

Fig. 1 illustrates the condensing apparatus of the present invention shown partly in elevation and partly in vertical cross-section; and Fig. 2 is a fragmentary vertical cross-section taken on line 2—2 of Fig. 1.

Similar reference characters refer to similar parts throughout the several views of the drawing and specification.

This invention is directed to condensing or scrubbing apparatus which is particularly useful in systems employed for the recovery of elemental sulfur from waste acidic gases containing compounds such as hydrogen sulfide, etc. The apparatus of the present invention are particularly useful in the sulfur recovery system described in our aforementioned Patent No. 2,534,792.

Referring now more particularly to the drawing, there is indicated at reference numeral 170 a sulfur condensing or scrubbing tower which is capped by a housing 171. The tower 170 is preferably built up from a series of baffle sections 172 arranged in superimposed relationship and capped by a distributing section 182 at the top thereof. Each of the baffle sections 172 comprise a tubular enclosing wall built up from steel plate which may be either round or polygonal in cross-section. The baffle sections 172 and the distributing section 182, as shown in Figs. 1 and 2, have enclosing walls which are approximately rectangular in cross - section. The upper and lower ends of each section 172 may be provided with outwardly flared flanges 173 by means of which the sections can be suitably connected together.

Each baffle section 172 contains a series of spaced horizontal extending frame bars 178, 179, 180, and 181, extending along opposite sides thereof, to which a series of inclined ladder bars 174, 175, and 176, are attached. It will be noted by referring more particularly to Fig. 2 that the ladder bars 174 and 176 are inclined in one direction while the intermediate bars 175 are inclined in the opposite direction. A series of horizontally spaced extending baffles such as bars 98, extend between and are secured to the series of ladder bars 174, 175 and 176 thereby forming a series of superimposed tiers of parallel horizontally spaced inclined grills. The baffles 98 may have an angular L-shaped cross-section and are preferably formed of corrosion resistant metal such as stainless steel. It will be noted that the baffles 98 are arranged in staggered relationship so that droplets or small streams of liquid falling on the upper bars will successively fall against successive baffles 98 as the liquid stream or droplets move downwardly through the successive baffle sections 172 of the tower 170.

The distributing section 182 has the same cross-sectional contour as the baffle sections 172, and is provided with outwardly flared flanges 183 at each end thereof. The lower flange 183 is bolted or secured to the upper flange 173 of the topmost baffle section 172.

The liquid line 96 is connected to a horizontally extending distribution pipe 187 which enters into the top part of the distribution section 182. To the distribution pipe 187 is connected a series of branched pipes 188 each having a downwardly projecting row of nozzles 190 which direct the cooling liquid downwardly at various spaced points within the upper end of the distribution section 182. The inner end of the distribution pipe 187 may be supported by a bar 189 fixed at the ends thereof to the opposite side walls of the distribution section 182.

A series of relatively closely spaced inclined metal baffle plates 186 extends transversely across the interior of the distribution section. Immediately below the series of metal baffle plates 186 is another series of metal baffle plates 186' inclined in the opposite direction. The upper and lower series of baffle plates 186 and 186' are fixed to supporting bars 184 whose ends are secured to the opposite side walls of the distribution section 182. Directly below each row of nozzles 190 is a shallow receiving trough 191 into which the condensing liquid from the nozzles 190 may drop. Each trough 191 has a plurality of discharge nozzles 192 in the bottom thereof through which the condensing liquid may pour out. It will be noted by referring to Fig. 2 that the upper and lower series of baffle plates 186 and 186' are cut away as indicated at 193A directly below each row of nozzles 190, so as to permit the coolant liquid to flow from nozzles 190 directly into the receiving troughs 191 without interference from the baffle plates 186 and 186'. It will be appreciated that the baffle plates 186 and 186' serve to provide surfaces upon which the sulfur vapors may condense and upon which sulfur spray will form into droplets which will drip downwardly from trough 191 through nozzles 192 in the tower.

Directly below each row of nozzles 192 is a splash board 193 supported upon angle bars 194 whose ends are secured to the opposite side walls of the distribution section 182. The coolant liquid discharged from nozzles 192 will splash against the splash boards 193 and thence further splash against the series of baffles 98 in the successive baffle sections 172. Thus the coolant liquid discharged from the nozzles 192 will be broken into small rain-like droplets which are agitated and distributed uniformly within the tower as they move downwardly toward the bottom thereof.

The scrubbing unit 170 is provided with a tank 91 at the base thereof in which the coolant liquid, preferably molten sulfur, is collected and contained. The tank 91 is built up of steel plate and is provided with a bottom wall 200 and enclosing side walls 201, above which the tower 170 is mounted. The enclosing side wall 201 may be reinforced by suitable frame members 203 and is divided internally by a partition wall 204 into a cooling section 205 and a pump sump section 206. The tank 91 may be provided with a cleanout door 218 provided at the lower end of the enclosing side wall 201 thereof. The coolant liquid or molten sulfur flows from the cooling section 205 under the division wall 204 into the pump sump section 206. The cooling section 205 contains cooling coils 92 joined at the ends thereof to an entrance header 207 and a discharge header 208. Cooling water enters the entrance header 207 by a water line 93 and is discharged through outlet pipe 209 connected to the discharge header 208. A steam line 94 may also be connected to the inlet header 207 to heat the coils 92, the steam being removed through an outlet line 210 connected to the discharge header 208.

The cooled liquid, such as molten sulfur, flowing into the pump sump section 206 is pumped by a pump 95 upwardly through the vertical line 96 which is connected at the upper end thereof to the distribution pipe 187. The pump 95 driven by a motor 95' extends into the liquid contained in the pump sump section 206.

The reaction gases containing the sulfur vapors to be scrubbed out enter the lower end of the scrubbing unit 170 through a suitable fitting 220 connected to the supply conduit 99 at a temperature approximately 270° to 450° F. The reaction gases with the entrained sulfur vapors rise upwardly through the tower 170 in counterflow to the downwardly splashing droplets of liquid sulfur distributed throughout the tower in small droplets by the splash plates 193 and baffles 98. Sulfur vapors entrained in the reaction gases are thus washed out or condensed by the downwardly cascading stream of liquid sulfur, which has a temperature of 260° to 270° F.

The inclined baffle plates 186 and 186' provide spray removal surfaces on which any remaining vapors not removed from the reaction gases may be caught. The scrubbed reaction gases, free of sulfur vapor, pass out through the discharge port 221 at the upper end of the housing 171 of the scrubber unit. The housing 171 of the scrubber unit may be provided with access ports 222 which provide access to the interior of the tower.

The stream of molten sulfur pumped into the upper end of the distribution section by the pump 95 through the supply line 96 cascades downward and is joined by additional molten sulfur produced by the condensation of the sulfur vapors entrained in the reaction gases passing upwardly through the tower 170. This molten sulfur collects in the cooling section 205 where it is cooled down to a temperature of approximately 260° F. to 270° F. by the cooling coils 92. Water flowing through the cooling coils 92 serves to maintain the liquid sulfur at the desired predetermined temperature. In a typical operation the water may enter the cooling coils 92 at a temperature of approximately 80° F. and leave the coils through the water discharge line 209 at a temperature of approximately 120° F. Should it be desirable to heat the sulfur contained in the pump sump section 206 and the cooling section 205 as during periods of shutdown, steam may be passed through the cooling coils 92 and admitted through the steam line 94 and discharged through the steam line 210. The pump 95 operates continuously during operations and transfers the molten sulfur from the pump sump section 206 to the distribution system within the section 182. The molten sulfur accumulating in the pump section 206 may be drained off continuously or intermittently through the weir line 99 to a receiving vessel, which if desired may be suitably heated to permit ready removal of the elemental sulfur in liquid form.

In order to secure maximum liquefaction of the sulfur vapors entering the tower 170 it is desirable that the reaction gases discharged from the tower 170 through outlet 221 be held at approximately 260° F., that is to say, the gas escaping from the tower should be as close to the freezing point of sulfur as possible, and preferably only sufficiently above the freezing point to prevent the solidification of sulfur in the upper part of the tower and ducts leading from the tower.

In the tower 170 due to the direct contact of the cooled molten sulfur with the entering gas, the temperature of such gas is rapidly reduced. In passing upwardly through the tower the gases are substantially cooled and are discharged at a temperature of about 260° F.

It is found that when operating the process in the manner described, the gases discharged from the top of the scrubber unit 170 are substantially denuded of free sulfur and contain but a small amount of combined sulfur. If desired, this gas may be discharged from the system.

The gases and vapors uncondensed in the scrubber unit 183 pass out through outlet 221. This effluent gas contains substantially all the carbon dioxide in the waste acid gas feed, the nitrogen from the air, and the water vapor in the feed and produced during the reaction, together with the indicated minor amounts of hydrogen sulfide and sulfur dioxide which is so small that the effluent gas is substantially free of obnoxious odor and accordingly may be discharged into the atmosphere.

While preferred embodiments of the invention have been described, it is understood that these are given didactically to illustrate the fundamental principles involved, and not as limiting the useful scope of the invention to the particular embodiments illustrated.

We claim:

1. Condensing apparatus comprising a plurality of superimposed baffle sections, a distributing section mounted on top of said baffle sections, a gas inlet and a condensate outlet for the bottom baffle section, a condensing fluid inlet and a gas outlet for said distributing section, a plurality of superimposed tiers of parallel horizontally spaced inclined grills consisting of horizontal baffles of substantially L-shaped cross section within each of said baffle sections, the incline angle of one tier of grills being opposite to that of a vertically adjacent tier of grills, said baffles in each grill being horizontally offset and spaced apart a substantial distance to allow for passage of gases, at least two series of horizontally spaced inclined baffle plates within said distributing section, said first series disposed below said second series of plates, a series of troughs disposed beneath said baffle plates, said condensing fluid inlet comprising a series of nozzles disposed above said baffle plates and adapted directly to charge said troughs with condensing fluid, a plurality of apertures in said troughs, a series of splash boards disposed under said apertures, a condensate sump disposed beneath said baffle sections, cooling coils within said sump, an outlet for said sump, and a pipe interconnecting said sump outlet to said condensing fluid inlet.

2. In a condensing tower including a gas inlet and condensate outlet in the lower portion of said tower, a gas outlet and a condensing fluid inlet in the upper portion of said tower, a distributing section disposed below said condensing fluid inlet and having at least two series of horizontally spaced inclined baffle plates, said first series disposed below said second series of plates, a series of troughs below said second series of baffle plates, said condensing fluid inlet comprising a series of nozzles disposed above said baffle plates and adapted directly to charge said troughs with condensing fluid, a plurality of apertures in said troughs, and a series of splash boards disposed under said apertures; a plurality of superimposed tiers of parallel horizontally spaced inclined grills consisting of horizontal baffles of substantially L-shaped cross section, the incline angle of one tier of grills being opposite to that of a vertically adjacent tier of grills, said baffles in each grill being horizontally offset and spaced apart a substantial distance to allow for passage of gases.

SAMUEL L. NEVINS.
JAMES S. GILLIAM, Jr.

REFERENCES CITED

The following references are of record in the file of this patent:

UNITED STATES PATENTS

| Number | Name | Date |
| --- | --- | --- |
| 1,138,081 | Carrier | May 4, 1915 |
| 1,257,400 | Robinson | Feb. 26, 1918 |
| 1,929,712 | Pearce | Oct. 10, 1933 |
| 1,972,884 | Gleason et al. | Sept. 11, 1934 |
| 1,972,885 | Gleason et al. | Sept. 11, 1934 |
| 1,989,033 | Weir | Jan. 22, 1935 |
| 2,204,447 | Samans | June 11, 1940 |
| 2,369,264 | Brink et al. | Feb. 13, 1945 |
| 2,386,390 | Fernelius et al. | Oct. 9, 1945 |

FOREIGN PATENTS

| Number | Country | Date |
| --- | --- | --- |
| 527,616 | Great Britain | Oct. 11, 1940 |